US008825846B2

(12) United States Patent
Goncharov

(10) Patent No.: US 8,825,846 B2
(45) Date of Patent: Sep. 2, 2014

(54) PROACTIVE INTELLECTUAL PROPERTY ENFORCEMENT SYSTEM

(76) Inventor: Max Goncharov, Tarqt (DE)

(*) Notice: Subject to any disclaimer, the term of this patent is extended or adjusted under 35 U.S.C. 154(b) by 0 days.

(21) Appl. No.: 13/316,267

(22) Filed: Dec. 9, 2011

(65) Prior Publication Data

US 2012/0151050 A1 Jun. 14, 2012

Related U.S. Application Data

(60) Provisional application No. 61/421,969, filed on Dec. 10, 2010.

(51) Int. Cl.
*G06F 15/173* (2006.01)

(52) U.S. Cl.
USPC ........... 709/224; 709/200; 709/223; 705/901; 705/902; 705/903; 705/904; 707/10

(58) Field of Classification Search
USPC .......... 709/200, 203, 224; 705/901, 902, 903, 705/904
See application file for complete search history.

(56) References Cited

U.S. PATENT DOCUMENTS

| | | | | |
|---|---|---|---|---|
| 7,251,832 | B2* | 7/2007 | Venters et al. | 726/26 |
| 8,131,646 | B2* | 3/2012 | Kocher et al. | 705/54 |
| 2001/0032312 | A1* | 10/2001 | Runje et al. | 713/172 |
| 2002/0095582 | A1* | 7/2002 | Peled et al. | 713/180 |
| 2004/0049462 | A1* | 3/2004 | Wang | 705/50 |
| 2005/0060542 | A1* | 3/2005 | Risan et al. | 713/165 |
| 2005/0108248 | A1* | 5/2005 | Natunen | 707/10 |
| 2006/0206486 | A1* | 9/2006 | Strickland | 707/9 |
| 2007/0033408 | A1* | 2/2007 | Morten | 713/176 |
| 2007/0226368 | A1* | 9/2007 | Strickland | 709/243 |
| 2008/0014917 | A1* | 1/2008 | Rhoads et al. | 455/422.1 |
| 2008/0034276 | A1* | 2/2008 | Ficco | 715/201 |
| 2008/0126294 | A1* | 5/2008 | Ray et al. | 707/1 |
| 2008/0289006 | A1* | 11/2008 | Hock et al. | 726/4 |
| 2010/0027588 | A1* | 2/2010 | O'Shea et al. | 375/147 |
| 2010/0057563 | A1* | 3/2010 | Rauber et al. | 705/14.53 |
| 2010/0076827 | A1* | 3/2010 | Fernandez | 705/14.4 |
| 2010/0091336 | A1* | 4/2010 | Bradley et al. | 358/3.28 |
| 2012/0070125 | A1* | 3/2012 | Lin et al. | 386/241 |
| 2012/0117659 | A1* | 5/2012 | Gearhart et al. | 726/27 |
| 2012/0263398 | A1* | 10/2012 | Martin-Cocher et al. | 382/299 |
| 2012/0323651 | A1* | 12/2012 | Fernandez | 705/14.4 |

OTHER PUBLICATIONS

Benevenuto et al., "Impact of Peer Incentives on the Dissemination of Polluted Content", ACM, SAC '06, Apr. 23-27, 2006, pp. 1-5.*
Cai et al.,"A Holistic Mechanism Against file Pollution in Peer-to-Peer Networks", ACM, SAC'09, Mar. 8-12, 2009, pp. 28-34.*
Ruan et al., TasteBuddy-based Version Selection Strategy for BitTorrent Users against Content Pollution, 2007, pp. 1-6.*
Hamida et al., "Hierarchical Traceability of Multimedia Documents", Computational Intelligence in Cyber Security (CICS), 2011 IEEE Symposium, pp. 108-113.*

* cited by examiner

*Primary Examiner* — Anthony Mejia
(74) *Attorney, Agent, or Firm* — Patterson & Sheridan LLP

(57) ABSTRACT

A proactive intellectual property enforcement system is disclosed. File sharing services may be disrupted by uploading a collection of multiple modified versions of a media file. The collection of modified copies may each include a distinct portion of modified and unmodified content. However, even though each modified copy includes a distinct variation of modified and unmodified content, the set of modified files are constructed such that some common portion (or portions) of the media file are always created as the modified version. Thus, a complete, unmodified copy of the media title cannot be reconstructed from the set of modified copies.

16 Claims, 4 Drawing Sheets

PROACTIVE INTELLECTUAL PROPERTY ENFORCEMENT SYSTEM

CROSS REFERENCE TO RELATED APPLICATIONS

This application claims benefit of U.S. Provisional Patent Application Ser. No. 61/421,969 filed Dec. 10, 2010, which is incorporated herein by reference in its entirety.

BACKGROUND OF THE INVENTION

1. Field of the Invention

Embodiments of the invention generally provide a proactive intellectual property enforcement system (PIPES). More specifically, embodiments of the invention relate to an approach for generating a collection of partially fake copies of a media title distributed file sharing services.

2. Description of the Related Art

Users exchange large volumes of media content every day, e.g., by downloading digital files over peer-to-peer sharing networks and from file sharing sites. For example, web-sites are available that publish direct links to files available from a file-hosting service as well as links to files hosted in peer-to-peer file sharing networks (e.g., by posting a link to a bittorrent seed file). Frequently, media content available over peer-to-peer networks and file sharing sites is being distributed in violation of copyright (or other intellectual property) laws. However, approaches to prevent unauthorized file sharing have met with limited success. As a result, media content owners (such as a distributor of a new musical album or a movie studio releasing a new motion picture) can expect whatever they release to be made available on such network sharing sites and peer-to-peer sharing networks shortly after (and frequently even before) an official release. While estimates differ at how much this activity actually reduces legitimate sales, it is generally accepted that that unauthorized file sharing is having a negative effect on the value for digital media properties.

This reality creates a strong demand for intelligent, proactive and approaches for digital rights management. That is, for techniques to limit, prevent, or otherwise disrupt the unauthorized sharing in order to protect the intellectual property rights of the media content owners.

SUMMARY OF THE INVENTION

One embodiment of the invention provides a technique for generating a plurality modified copies of a source file. This method may include generating each respective modified copy by determining an initial, unmodified portion of the modified copy. The initial, unmodified portion is set to a first point in the source file in a first modified copy and incremented by a specified amount for each successive modified copy, up to a second point in the source file. Generating each respective modified copy also includes following the initial unmodified portion, generating an alternating sequence of modified and unmodified portions, based on a fixed modification size, until reaching an end point in the source file.

Another embodiment of the invention includes a method of disrupting a file sharing service. This method may generally include generating a plurality of modified copies of a source file. Each modified copy includes an initial, unmodified portion of a distinct size, followed by an alternating sequence of modified and unmodified portions of the modified copy based on the modification size, until reaching an end point, and each modified copy also shares at least one region of modified content. This method may also include publishing the plurality of modified copies of the source file at a file sharing service.

Additional embodiments include a computer-readable storage medium storing an application, which, when executed on a processor, performs the above recited method as well as a system having a processor and a memory storing an enterprise information asset management application program, which, when executed on the processor, performs the above recited method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
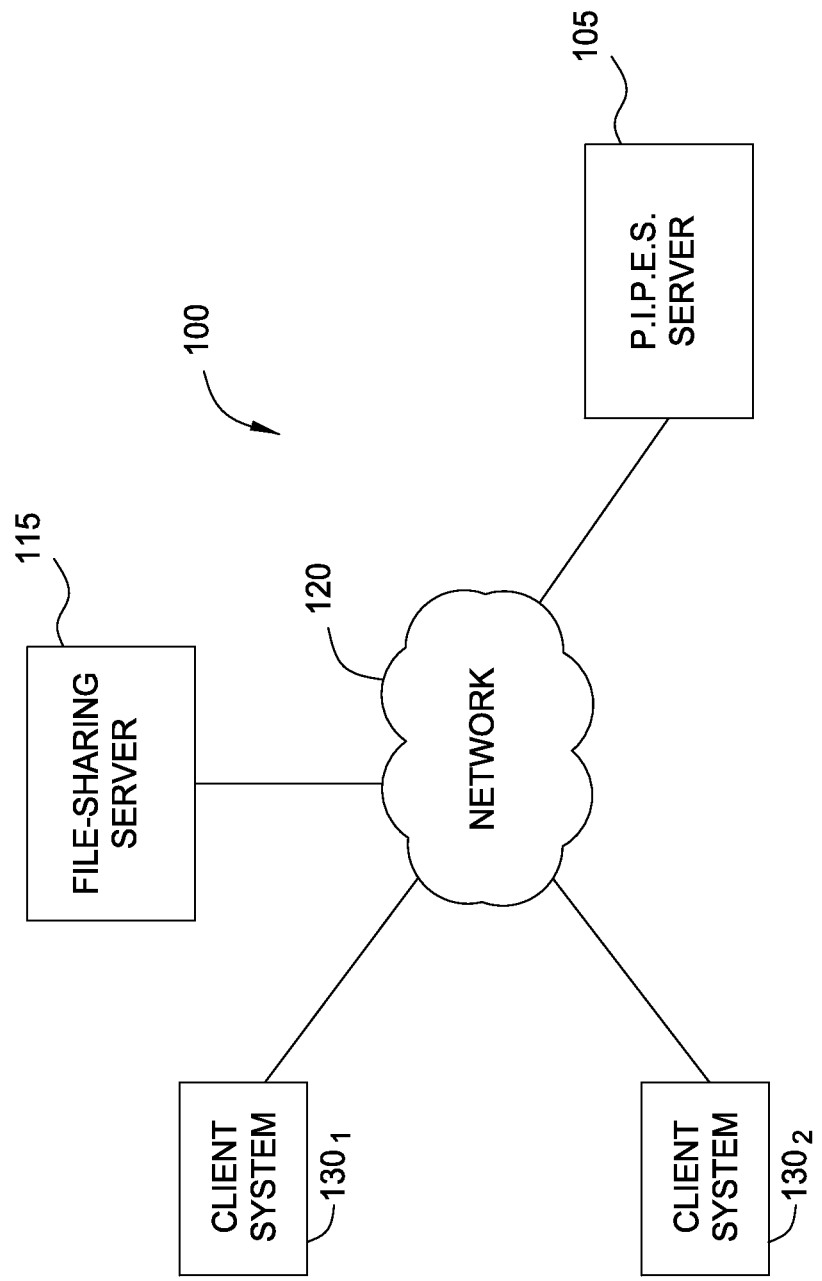
FIG. 1 illustrates a computing infrastructure configured provide a proactive intellectual property enforcement system, according to one embodiment of the invention.

Embodiments of the invention provide a proactive intellectual property enforcement system. In one embodiment, a data server is configured to generate a plurality of copies of a selected media title. Each such copy includes some portion of authentic content as well as portions of modified content. The modifications could simply be degraded portions of quality, but could also be blank portions with no content, or portions that carry alternative content. For example, a collection of modified copies of a MP3 audio file could include sections where the audio quality is substantially degraded for different portions, relative to the authentic portions. Doing so may prevent the copy from being programmatically identified as being a fake—but still provide users with what may ultimately be an unacceptable substitute for a legitimate copy of the media title.

As noted, the collection of modified copies (also referred to as fake or pseudo copies) each include distinct portions of modified and unmodified content. However, in one embodiment, each modified copy begins with some variable portion of unmodified content. As a result, the fake copy cannot be distinguished from the original when playback initially begins. Thus, the initial portions do not reveal that a file being downloaded is, in fact, a modified copy of the media file.

Further, even though each copy includes a distinct variation of modified and unmodified content, the set of modified files are constructed such that some common portion (or portions) of the media file are always created as the modified version. Thus, a complete, unmodified copy of the media title cannot be reconstructed from the set of modified copies. Further still, by providing many distinct modified copies, it may become difficult for peer-to-peer and file sharing networks to "weed-out" all of modified copies, reducing the ability (and therefore the attractiveness) of obtaining unauthorized copies from file sharing services. While a complete unmodified copy may still ultimately make its way to peer-to-peer and file sharing networks, distributing a large number of partially modified copies when a media title is first released for legitimate distribution may make it difficult for individuals to find an unauthorized copy when the media title is first released. Doing so may help improve the protection of the media content during a limited period of time for the sales and revenue bootstrapping that occurs concurrently with a new title being released, i.e., when interest in obtaining the media title is at a peak. Thus, the proactive intellectual property protection system described below provides reasonable hardware, software and human resources to the field of successful protection of the intellectual property during the limited period of time following a release, e.g., music album, movies, digital book releases, etc.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, a particular embodiment of the invention is described using an MP3 music file as an example of an original digital media file which may be used as a basis for creating the set of modified copies. However, it should be understood that the invention may be adapted for a broad variety of digital media content, encoded using a variety of different protocols or formats. Accordingly, references to the particular example embodiment are included to be illustrative and not limiting.

FIG. 1 illustrates a computing infrastructure 100 configured to provide a Proactive Intellectual Property Enforcement System (PIPES), according to one embodiment of the invention. As shown, the computing infrastructure 100 includes a PIPES server 105, a plurality of client systems $130_{1-2}$, and a file sharing server 115, each connected to a communications network 120. And the server computer 105 includes a web server 110, an application server 115 and a database 125.

In one embodiment, the systems $130_{1-2}$ communicate over the network 120 to interact with a file sharing server 115 to obtain copies of files hosted on the file sharing server 115 (e.g., to download media content files). For example, each client $130_{1-2}$ may include a web browser used to create a connection with the file sharing server 115, download and render an interface listing the files available from the file sharing server 115. Such links may provide a client system 130 with a direct link used to download a file hosted by the file sharing server 115 (or another server), but may also include peer-to-peer seed links where one client system 130 is then downloaded from other client systems 130. Additionally, users may upload files to the file sharing server 115. For example, as described in greater detail below, the PIPES server 105 may be configured to create a large number of modified copies of a given media file, and upload them to the file sharing server 115. Doing so may make it difficult for users interacting with client systems 130 (and file sharing server 115), to obtain a copy of a media title, apart from one of the modified ones.

Figure 2:
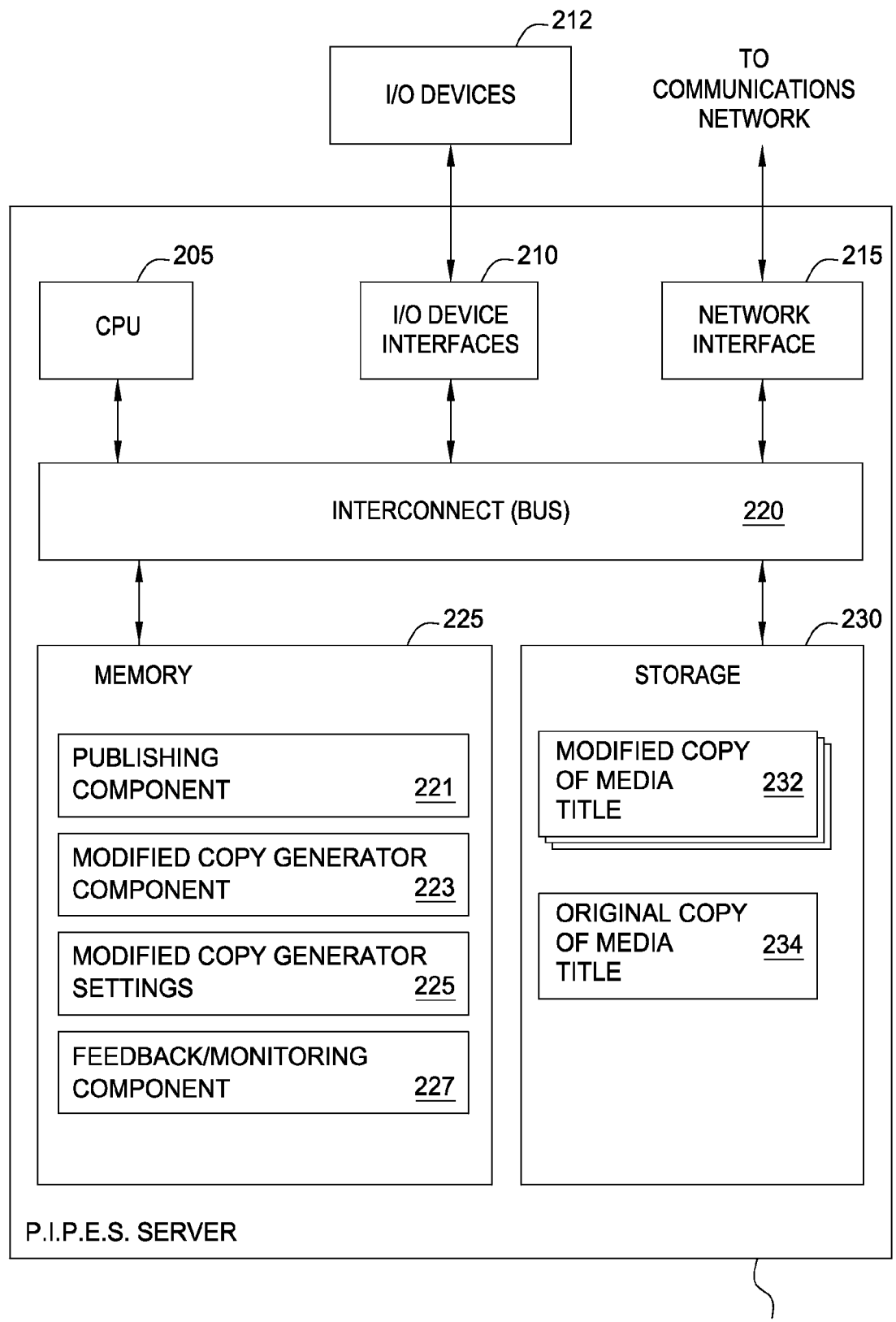
FIG. 2 is a more detailed view of the PIPES server computing system of FIG. 1, according to one embodiment of the invention.

FIG. 2 is a more detailed view of the PIPES server computing system of FIG. 1, according to one embodiment of the invention. As shown, the PIPES server 105 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data. The storage 230 may be a hard disk drive or solid state storage device (SSD). Further, although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 includes a publishing component 221, a modified copy generation component 223, modified copy configuration settings 225, and a feedback/monitoring component. And the storage 230 includes a set of modified copies 232 of a media title along with an original copy 234 of the media title. The original copy 234 of the media title may be a file, e.g., a set of MP3 files received from an authorized source (e.g., the content owner) prior to an official release of the media title 234 (or at the same time with the release the media file). Once received, the generator component 223 produces a pre-calculated number of the media instances (i.e., of modified copy 232) for the publishing to the file sharing services.

Figure 4:
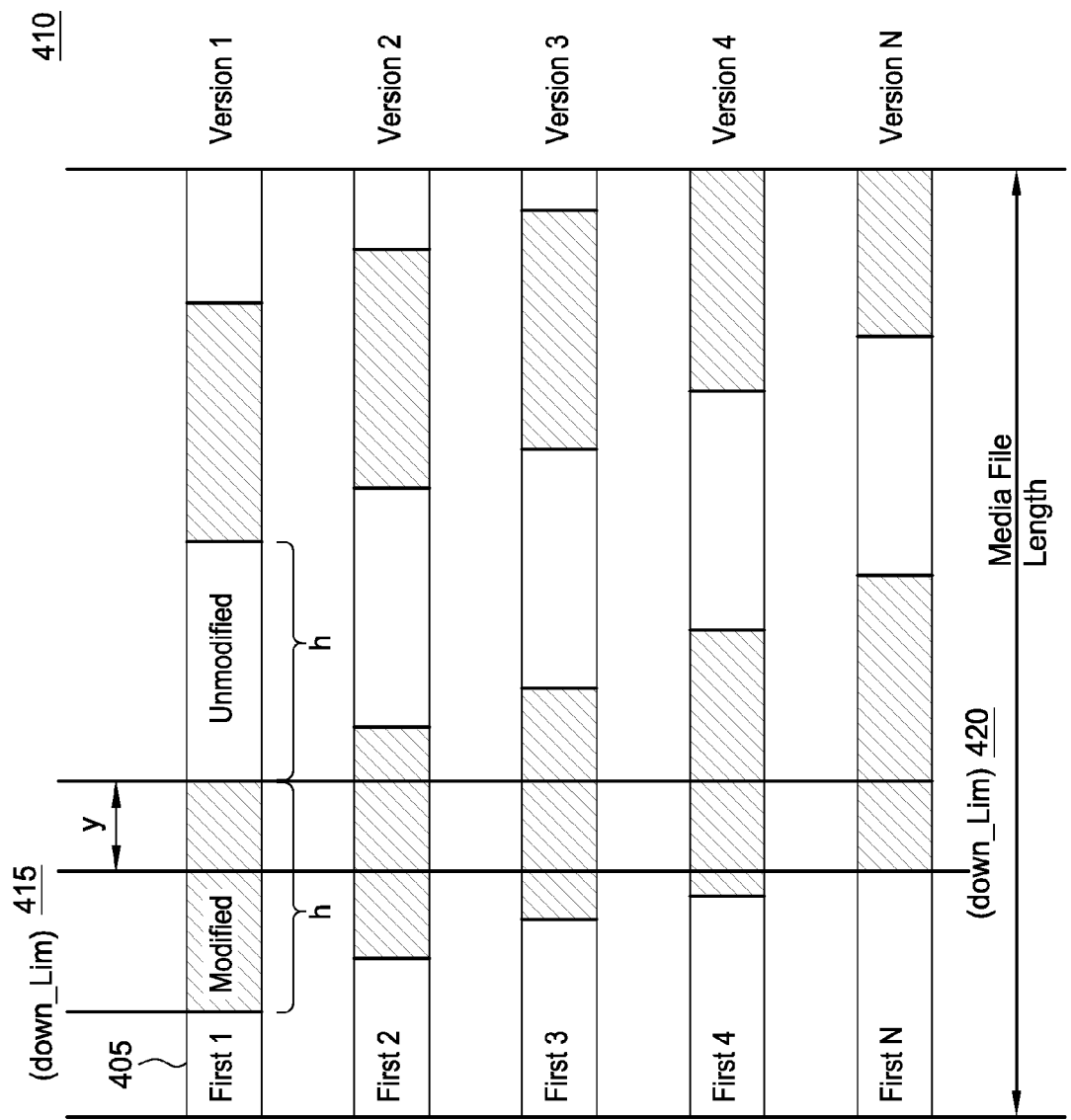
FIG. 4 illustrates an example set of copies of a media title modified to disrupt unauthorized file sharing services, according to one embodiment of the invention.

As noted, each of the modified copy 232 includes a distinct set of modified and unmodified portions, where at least one segment of the original copy 234 is modified in each modified copy 232. In one embodiment, the modified copy generator component 223 provides a software application configured to generate the modified copies 232 from the original copy 234. The number and structure of the modified copies 232 are specified using the configuration settings 225. Such settings may specify as set of variables defining how many modified copies to create as well as the resulting structure of the modified copies (i.e., which sections are modified in each modified copy, the length of the initial unmodified segments, as well as which portions get modified in each modified copy). FIG. 4, discussed below, provides more detailed example of the configuration settings 225 being used to create a collection of modified copies 232 from an original copy 234.

Once generated, the publishing component 224 may be configured to upload the set of modified copies 234 to a file sharing service (or services). Alternatively, the publishing component could create a seed file for each modified copy and publish the seeds to peer-to-peer networks. Further, in one embodiment, the publishing component 224 may be used to upload different sets of modified copies to different file sharing sites. Doing so may help the content owner understand how illicit files spread from one location to another. For example, by determining a unique identifier for each modified copy (e.g., an MD5 or SHA1 hash value) the spread of the file may be traced during the entire life of the stamped media, including logging. Accordingly, the feedback/monitoring component 227 may be configured to scan known file sharing services for instances of the modified copies 232, download copies, and determine which one of the modified copies 232 it is.

Figure 3:
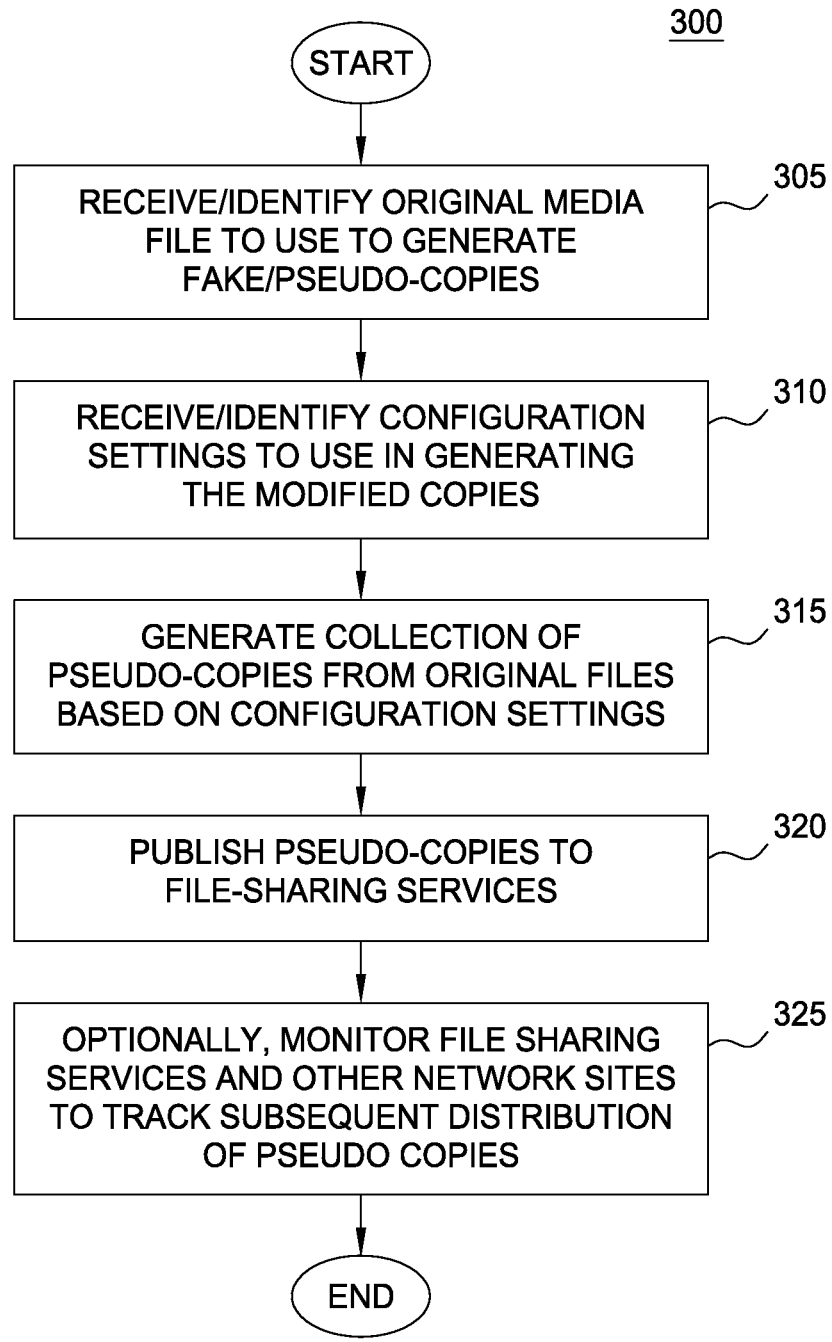
FIG. 3 illustrates a method for generating a set of partially modified copies of a media title in order to disrupt unauthorized file sharing services, according to one embodiment of the invention.

FIG. 3 illustrates a method 300 for generating a set of partially modified copies of a media title in order to disrupt unauthorized file sharing services, according to one embodiment of the invention. As shown, the method begins at step 305, where the PIPES server receives a source (or original) copy of a media file to use to generate fake/pseudo copies, i.e., to generate the set of modified copies. And at step 310, the PIPES server receives the configuration settings to use in generating the modified copies.

At step 315, the PIPES server generates the collection of modified copies from the original file (as specified by the configuration settings). Once generated, the publishing component of the PIPES server uploads the modified copies to one or more file sharing services (step 320). Optionally, once uploaded, the monitoring component of the PIPES server may track the subsequent download and redistribution of the modified copies (step 325).

FIG. 4 illustrates an example set of copies of a media title modified to disrupt unauthorized file sharing services, according to one embodiment of the invention. As noted, the media copies (labeled version 1 to version n) are generated according to user-configurable configuration settings that result in the each modified copy to include an initial, unmodified portion as well as both a distinct set of modified and unmodified portions, and where at least one common portion is modified in each copy.

In one embodiment, the configuration settings include the size of the complete media file (e.g., the byte size or audio length of an MP3 file), a downstream limit (down_lim) and an upstream limit (up_lim), and an incrementing value. Additionally, while the configuration settings may specify units as a size (e.g., in bytes) or in units of time, references below use time-based units as an example.

As shown, each modified copy includes an initial unmodified section (labeled as first 1 to first N), followed by alternating modified and unmodified segments of time-length [h], up to the length of the file.

Note, the period of time represented by [h] is the same size for each modified and unmodified section (e.g., a period of a few seconds). However, by varying the length of "first" for each modified copy, the point in each version where the alternating modified and unmodified segments begins is different for each modified copy. Illustratively, the size of first1 405 in the first modified copy 410 (labeled version 1) is set to the downstream limit (down_lim 415) provided by the configuration settings. By increasing of the length of the first section by the incrementing value (e.g., a tenth of a second), the PIPES system generates a set of modified copies that are unique relative to one another. That is, each modified version has a distinct range of modified and unmodified portions.

As noted, each modified version begins with an initial unmodified portion incremented in each successive modified version. In one embodiment, the length of the initial unmodified portion (first) may be extended up a specified upstream limit (up_lim 420), where the upstream limit is set to be less than the size of first1 and [h]. Doing so results in a region (labeled y) in each version that stores modified content. That is, each modified version, while having a distinct set of modified and unmodified portions, also shares a common portion which is always modified.

Further, while the modified versions shown in FIG. 4 have a single first section, common section ("y") and alternating segments that continue for the complete length of the media file, one of ordinary skill in the art will recognize that the endpoint for alternative segments need not be the end of the file itself. For example, the endpoint for alternative segments could be set to ½ of the length of the media file. In such a case, the overall modification process could be repeated from the midway point of the media file. Thus, a secondary first portion could begin immediately following the midway point, be extended by a incremental amount between a second down_lim and up_lim, and followed by alternating portions of modified and unmodified points (of length h) up to the end of the media file. Doing so would result in a second region common to each version that stored modified content. Of course, one of ordinary skill in the art will recognize that the general process for generating modified copies for a given media file could be further subdivided with additional begin and end points.

By generating the modified versions using the process and configuration settings described above, the following mathematical relationships hold:

$$\text{first}_1 + h > \text{first}_N \tag{1}$$

To achieve equality for equation (1), add [y] to the $\text{first}_N$:

$$\text{first}_1 + h > \text{first}_N + y \tag{2}$$

Consider the integer given by $\epsilon$*length where ($[\epsilon]$—coefficient) for making adjustments to the size of the [y] regions (in correspondence with the length of the media file).

$$y = \epsilon * \text{length} \tag{2a}$$

Note, [y] equals the length of the "common" section in each modified version, and it is assumed that [y]>0. As a result, $$h = (\text{first}_n - \text{first}_1) + y \tag{3}$$

In one embodiment, the size of the first1 (i.e., the modified version with the smallest initial segment) may be generated as follows:

$$\text{first}_1 = 0.01 * \text{downlim} * \text{length} \tag{4}$$

Where [downlim]—length determines a percentage of unmodified section of the first modified version relative to the length of the entire media file. Similarly, $$\text{first}_N = 0.01 * \text{uplim} * \text{length} \tag{5}$$

Where [uplim]—length determines a percentage of an unmodified section of the last modified version, relative to the length of the entire media file. One equation for determining how much to increase the size of the first initial unmodified portion is given by:

$$\Delta\text{first} = \text{first}_{i+1} - \text{first}_i = \frac{0.01 * \text{length}(uplim - downlim)}{n} \tag{6}$$

Where [n] equals an entire number of modified versions. Lastly, a formula for setting the [i] member of the sequence for the [first] is given by:

$$\text{first}_i = 0.01 * \text{downlim} * \text{length} + (i-1) * \Delta\text{first} \tag{7}$$

So, providing the configuration settings of [downlim], [uplim] and [ϵ], allows the value of [y] variable may be determined as well as allows the PIPES system to determine the length of first for each related track.

In sum, a proactive intellectual property enforcement system is disclosed. File sharing services may be disrupted by uploading a collection of multiple modified versions of a media file. The collection of modified copies may each include a distinct portion of modified and unmodified content. However, even though each modified copy includes a distinct variation of modified and unmodified content, the set of modified files are constructed such that some common portion (or portions) of the media file are always created as the modified version. Thus, a complete, unmodified copy of the media title cannot be reconstructed from the set of modified copies.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for generating a plurality modified copies of a source file storing digital media content:
   generating each respective modified copy by:
      determining an initial, unmodified portion of the modified copy, wherein the initial, unmodified portion is set to a first point in the source file in a first modified copy and incremented by a specified amount for each successive modified copy, up to a second point in the source file and wherein each modified copy is assigned a unique identifier, and
      following the initial unmodified portion, generating an alternating sequence of modified and unmodified portions, based on a fixed modification size, until reaching an end point in the source file, wherein each modified portion degrades a playback quality of the digital media content and wherein each of the plurality of modified copies share at least one portion of modified content in common, such that a complete, unmodified copy of the source file cannot be reconstructed from the plurality of modified copies; and
   tracing at least one of the modified copies spreading from one location to another location using the unique identifier.

2. The method of claim 1, wherein the modification size specifies a number of bytes for each modified and unmodified portion in the plurality of modified copies.

3. The method of claim 1, wherein the modification size specifies a time interval corresponding to playback of the digital media content.

4. The method of claim 1, further comprising:
   publishing the plurality of modified copies of the source file at a file sharing service.

5. The method of claim 4, further comprising:
   monitoring one or more downloads of one of the modified copies from the file sharing service.

6. The method of claim 4, wherein the file sharing service is a peer-to-peer network, and wherein publishing the plurality of modified copies of the source files comprises publishing seed files indicating the presence of the source file.

7. A method of disrupting a file sharing service, comprising:
   generating a plurality of modified copies of a source file storing digital media content, wherein each modified copy includes an initial, unmodified portion of a distinct size, followed by an alternating sequence of modified and unmodified portions of the modified copy based on a fixed modification size until reaching an end point, wherein each modified copy shares at least one region of modified content, wherein each modified portion degrades a playback quality of the digital media content, wherein each of the plurality of modified copies share at least one portion of modified content in common, such that a complete, unmodified copy of the source file cannot be reconstructed from the plurality of modified copies, and wherein each modified copy is assigned a unique identifier; and
   publishing the plurality of modified copies of the source file at least a first file sharing service; and
   tracing a spread of at least one of the modified copies from the first file sharing service based on the unique identifier.

8. The method of claim 7, further comprising:
   monitoring one or more downloads of one of the modified copies from the first file sharing service.

9. A non-transitory computer-readable storage medium containing a program which, when executed by a processor, performs an operation for generating a plurality modified copies of a source file storing digital media content, the operation comprising:
   generating each respective modified copy by:
      determining an initial, unmodified portion of the modified copy, wherein the initial, unmodified portion is set to a first point in the source file in a first modified copy and incremented by a specified amount for each successive modified copy, up to a second point in the source file and wherein each modified copy is assigned a unique identifier, and
      following the initial unmodified portion, generating an alternating sequence of modified and unmodified portions, based on a fixed modification size, until reaching an end point in the source file, wherein each modified portion degrades a playback quality of the digital media content and wherein each of the plurality of modified copies share at least one portion of modified content in common, such that a complete, unmodified copy of the source file cannot be reconstructed from the plurality of modified copies; and
   tracing at least one of the modified copies spreading from one location to another location using the unique identifier.

10. The non-transitory computer-readable storage medium of claim 9, wherein the modification size specifies a number of bytes for each modified and unmodified portion in the plurality of modified copies.

11. The non-transitory computer-readable storage medium of claim 9, wherein the modification size specifies a time interval corresponding to playback of the digital media content.

12. The non-transitory computer-readable storage medium of claim 9, wherein the operation further comprises:
    publishing the plurality of modified copies of the source file at a file sharing service.

13. The non-transitory computer-readable storage medium of claim 12, wherein the operation further comprises:
    monitoring one or more downloads of one of the modified copies from the file sharing service.

14. The non-transitory computer-readable storage medium of claim 12, wherein the file sharing service is a peer-to-peer network, and wherein publishing the plurality of modified copies of the source files comprises publishing seed files indicating the presence of the source file.

15. A non-transitory computer-readable storage medium containing a program which, when executed by a processor, performs an operation for disrupting a file sharing service, the operation comprising:
    generating a plurality of modified copies of a source file storing digital media content, wherein each modified copy includes an initial, unmodified portion of a distinct size, followed by an alternating sequence of modified and unmodified portions of the modified copy based on a fixed modification size until reaching an end point, wherein each modified copy shares at least one region of modified content, wherein each modified portion degrades a playback quality of the digital media content, wherein each of the plurality of modified copies share at least one portion of modified content in common, such that a complete, unmodified copy of the source file cannot be reconstructed from the plurality of modified copies, and wherein each modified copy is assigned a unique identifier; and
    publishing the plurality of modified copies of the source file to at least a first file sharing service; and
    tracing a spread of at least one of the modified copies from the first file sharing service based on the unique identifier.

16. The non-transitory computer-readable storage medium of claim 15, wherein the operation further comprises:
    monitoring one or more downloads of one of the modified copies from the first file sharing service.

* * * * *